United States Patent

[11] 3,548,978

[72] Inventor Elbert S. Dyke
 24 Atlas Drive, San Jose, Calif. 95126
[21] Appl. No. 815,774
[22] Filed Apr. 14, 1969
[45] Patented Dec. 22, 1970

[54] HYDRAULIC BRAKE BLEEDING APPARATUS
 7 Claims, 2 Drawing Figs.
[52] U.S. Cl. .................................................. 188/152
[51] Int. Cl. .................................................. B60t 11/30
[50] Field of Search ..................................... 188/152.14

[56] References Cited
 UNITED STATES PATENTS
1,825,013  9/1931  Patton ........................ 188/152(.14)
2,197,126  4/1940  Dick ....................(188/152.14)UX
2,209,784  7/1940  Maack et al. ................ 188/152(.14)

Primary Examiner—George E. A. Halvosa
Attorney—Thomas E. Schatzel

ABSTRACT: Apparatus which permits a single operator, with a minimal amount of labor, to bleed trapped air from the hydraulic brake system of a vehicle. A mobile carrier carries a brake fluid auxiliary supply source with a pump extending to the interior of the source to pump fluid through a pump line to the fluid reservoir of a master cylinder of the system which in turn extends to a wheel cylinder having a bleed valve port. A universal type connecting sealer may join the pump line for securing the pump line to the master cylinder about a filler opening extending to the reservoir. A discharge tube is fitted to the bleed valve port and extends to a hand carriable discharge reservoir.

PATENTED DEC 22 1970

3,548,978

INVENTOR.
ELBERT S. DYKE
BY Jack M. Wiseman
Thomas Schatzel
ATTORNEYS

HYDRAULIC BRAKE BLEEDING APPARATUS

BACKGROUND OF THE INVENTION

The present invention relates to apparatus which may be used by a single operator for bleeding trapped air from the hydraulic brake system of an automotive vehicle.

As is well known, air bubbles can become trapped in the fluid lines and cylinders of a hydraulic brake system whenever the brake fluid is drained or replaced. Such trapped air must be removed to insure safe and effective braking operation. Heretofore, the removal of such air required an operator plus a means for operating the brake pedal while the operator opened the bleed screw ports of each wheel cylinder to permit the air to be forced out by operation of the brake pedal. The means for operating the brake pedal in general took one of two forms—another human operator or a mechanical apparatus. Obviously the use of another operator was time-consuming and inefficient. At the same time, mechanical apparatus is quite complex, bulky and awkward to use.

SUMMARY OF THE INVENTION

The present invention teaches a portable and mobile hydraulic brake-bleeding apparatus which permits a single operator to bleed trapped air from a brake system without the necessity of actuating the brake pedal. The brake-bleeding operation may be done rapidly, with little waste of brake fluid ad with a small amount of labor.

The apparatus includes a brake fluid supply source which may be mounted on a mobile carrier. A driven fluid pump, which may also be mounted on the carrier, pumps fluid from the source through a supply line. The supply line is then tied in with the reservoir of the master cylinder of the brake system such that the pumped fluid exerts a pressure on the fluid in the reservoir and the system. A discharge tube joins the bleed valve port of a wheel cylinder. The discharge tube may extend to a portable fluid discharge reservoir. Thus, when the bleed valve port is opened, due to the pressure of the pumped fluid, brake fluid is discharged through the port until the port is closed. The discharge tube and fluid discharge reservoir may then be moved to another wheel cylinder for repeating the operation.

DESCRIPTION OF A PREFERRED EMBODIMENT

Figures 1, 2:
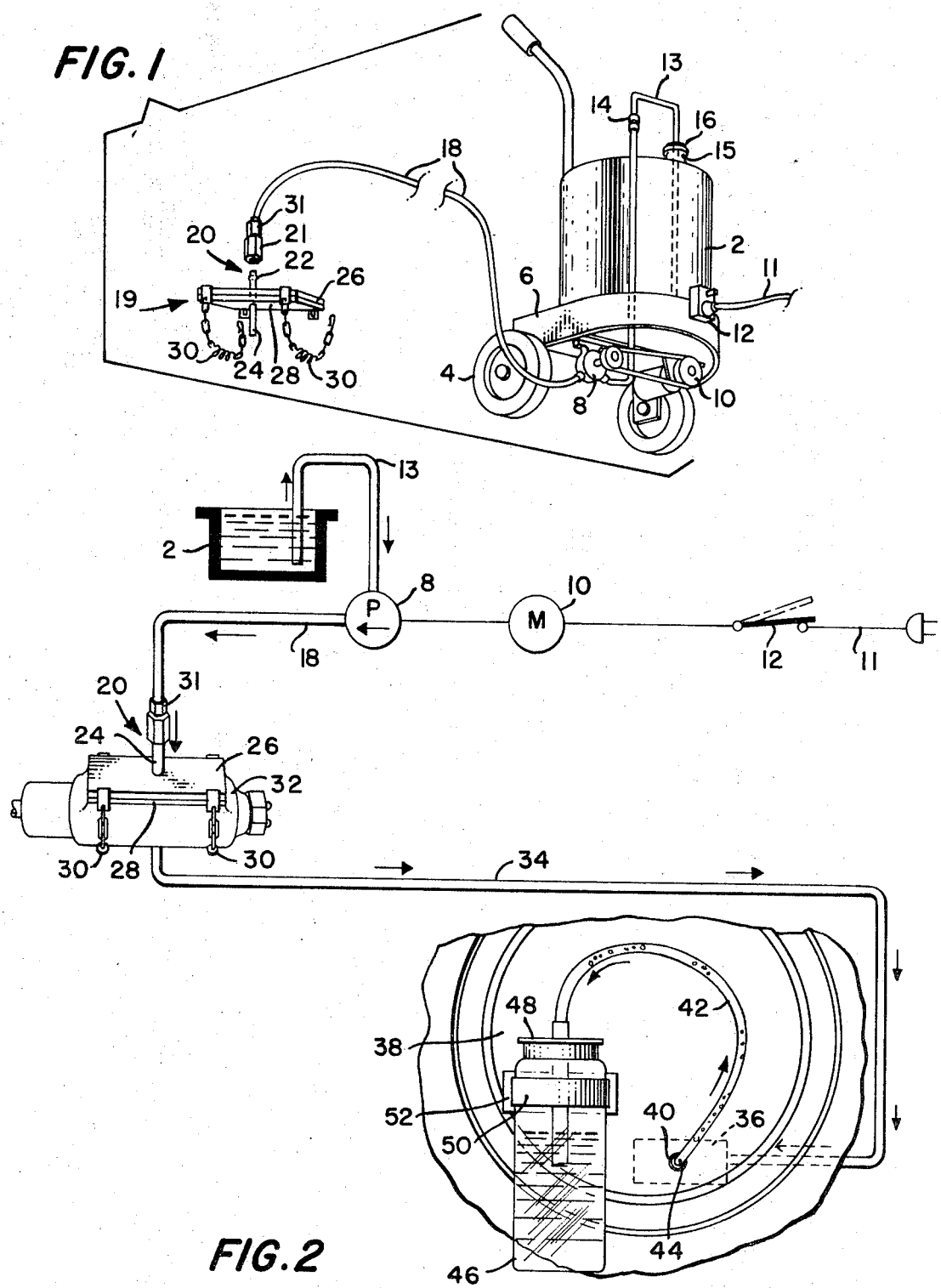
FIG. 1 is a view in perspective of a mobile, portable fluid supply source, pump and associated connections in accordance with the present invention.
FIG. 2 is a partially schematic diagram of a hydraulic brake system and apparatus of the present invention including connection of a wheel cylinder to a fluid discharge reservoir.

FIG. 1 illustrates a brake fluid supply source in the form of a drum 2 mounted on a mobile carrier in the form of a two-wheeled cart 4. The drum 2 may be a conventional storage type drum such as a five gallon drum in which brake fluid is commonly transported from a manufacturer to the consumer. The cart 4 has a supporting platform in the form of a bottom plate 6 supporting the drum 2. A fluid pump means having a circulating pump 8 and related driving motor 10 are also supported by the cart 4. The motor 10 may be an electrical motor with an extension cord 11 adapted for plug in to a conventional electrical socket with said cord extending through an on-off switch 12. An inverted U-shaped tube 13, which may include two sections coupled by a coupling 14, is coupled to the pump 8 and extends through an opening 15 of the top end to the interior of the drum 2. A seal coupling 16 secures the tube 13 to the drum 2. The coupling 16 may be such as to provide an air vent to the interior of the drum 2 to aid in circumventing the creation of a vacuum within the drum when the circulating pump 8 is activated. The use of the U-shaped tube 13 allows for the use of a drum 2 in its upright position. For example, a conventional drum 2 may be replaced with another conventional drum when desirable. There is no need to empty fluid from one drum to another or invert a drum.

The outlet of the pump 8 extends through a supply line 18, preferably a flexible plastic tube. The opposing end of the line 18 joins a connecting-sealing men means referred to by the general reference character 19, for coupling to a master cylinder reservoir of a hydraulic brake system. As depicted, the line 18 and the connecting-sealing means 19 are joined through a quick coupler 20. The coupler 20 has a female adapter portion 21 and a male adapter portion 22 extending to a short tube 24. The connecting-sealing means 19 includes a metal plate 26 through which the tube 24 protrudes. The tube 24 may take the form of a Y to accommodate master cylinders having a pair of fluid reservoirs not shown. The metal plate 26 is also secured to a rubber seal gasket 28. The flexibility and compressibility of the gasket 28 may be selected to accommodate master cylinders of various shaped filler openings to provide an airtight seal. The plate 26 supports opposing ends of variable tension fastener means in the form of a pair of quick release spring chains 30. As depicted by FIG. 2, the chains 30 may wrap around the body of a master cylinder 32. The tension on the chains 30 when secured in place is selected so as to provide an airtight seal between the connecting-sealing means and the master cylinder. The spring chains 30 provide a universal fastening means in that there are not particular fasteners or adapters necessary for engaging the chains to the master cylinder. Intermediate the coupling 20 and the output of the pump 8 there is also a check valve 31 to allow operation of the pump 8 when the connector-sealing means 19 is not in place.

In a conventional hydraulic brake fluid system for a vehicle, the master cylinder 32 extends through a tubular line 34 to a wheel cylinder 36. The wheel cylinder 36 controls the expansion and contracting of brakeshoes in relationship to a wheel drum on the vehicle. The cylinder 36 may be mechanically supported by a brake backing plate 38. Extending between the wheel cylinder 36 and the exterior of the brake backing plate 38 is a bleeder valve 40. The valve 40 may be opened or closed by a wrench to allow fluid to escape from the wheel cylinder.

As illustrated herein, a discharge line in the form of a clear flexible discharge tube 42 may be fitted to the valve 40 by means of a fitting 44 secured to the end of the tube 42. The other end of the tube 42 may extend to a portable fluid discharge reservoir in the form of a clear plastic jar container 46 having a top 48 joining the end of the tube 42. An angle arm 50 extends around the jar 46 and joins a magnet 52. The magnet 52 may hold the jar 46 in position relative to the backing plate 38.

In operation, the cart 4 is wheeled into position relative to the vehicle. The filler cap of the master cylinder 32 is removed. The tube 24 of the connecting-sealing means 19 is extended through the filler opening and the spring-chains 30 secured around the master cylinder 32. The check valve 31 may be opened and the vehicle raised up on a hoist. The fitting 44 of the tube 42 is then secured to the bleed valve port of a select wheel cylinder 36. The motor 10 and circulating pump 8 may then be actuated to pump fluid to the master cylinder 32. The bleeder valve 40 is opened to allow discharge of fluid and trapped air, if any, to the container 46. The air bubbles in the system may be visible in passing to the jar 46. The fluid in the system is forced to circulate as indicated by the arrows and replaced by that pumped from the drum 2. When indications are that no further air bubbles are contained in the fluid being discharged, the bleeder valve 40 is closed. The motor 10 may continue to operate and the process repeated for each wheel cylinder. The operator merely removes the tube 42 and fitting 44 from the bleed valve 40, grasps the jar 46 and carries it to the next wheel. Obviously, this allows an operator to efficiently and rapidly bleed each cylinder of the vehicle with very little waste of brake fluid and without the necessity of operating the brake pedal. It may be accomplished at remote locations with efficiency and minimal labor.

I claim:

1. Apparatus for circulating fluid through a wheel cylinder and lines leading thereto of a hydraulic brake system of a vehicle and bleeding trapped air therefrom comprising, in combination:

a brake fluid auxiliary supply source, said source being mobile;

pump means associated with the source for drawing fluid from the source and pumping said fluid under a pressure;

a first supply line means joining at one end the pump means and receiving the fluid from the pump means;

connecting-sealing means joining the supply line means and adapted for joining an opening to a fluid reservoir of a hydraulic brake system, the connecting-sealing means including a cover means having a tube extending therethrough with the first supply line means extending to said tube, the cover means including a flexible, compressible gasket means for engagement to said reservoir about said opening, a flexible securing member adapted to be engaged about the exterior of said reservoir and joined to a variable tension fastening means for securing the connecting-sealing means to said reservoir over said opening and providing an air seal between said reservoir and the connecting-sealing means; and portable means for directing the discharge of hydraulic brake fluid from the wheel cylinder of said vehicle to a fluid discharge reservoir.

2. The apparatus of claim 1 in which the brake fluid auxiliary source is in the form of a storage drum and in which said drum and the pump means are mounted on a mobile carrier.

3. The apparatus of claim 2 in which the means for directing the discharge of fluid includes a clear flexible tube having an adapter at one end for joining a bleeder valve of the wheel cylinder, the other end of the tube joining a hand-carriable container.

4. The apparatus of claim 3 in which an angle arm is engaged to and supports the container and carries a magnetic device for securing the arm to a metallic member of the vehicle.

5. The apparatus of claim 2 in which said storage drum has an opening through the top end and is supported up right on said mobile carrier and includes a U-shaped tube extending from the pump to the interior of said drum.

6. The apparatus of claim 5 in which the mobile carrier carries a supporting stand for supporting on one surface said storage drum and on the other surface the pump means.

7. The apparatus of claim 6 in which the means for directing the discharge of fluid includes a clear flexible tube having an adapter at one end for joining a bleeder valve of the wheel cylinder and the other end of the tube joining a clear jar container, and an angle arm engaged to and supporting the container, said angle arm carrying a magnetic device for securing the arm to a metallic member of the vehicle.